United States Patent [19]

Suzuki et al.

[11] 4,316,619
[45] Feb. 23, 1982

[54] PASSIVE SEATBELT SYSTEM

[75] Inventors: Ichiro Suzuki, Nagoya; Masanao Motonami; Hisashi Ogawa, both of Toyota, all of Japan

[73] Assignee: Toyota Jidosha Kogyo Kabushiki Kaisha, Toyota, Japan

[21] Appl. No.: 154,121

[22] Filed: May 28, 1980

[30] Foreign Application Priority Data

Jun. 14, 1979 [JP] Japan .................... 54-81255[U]

[51] Int. Cl.³ .................................................. B60R 21/10
[52] U.S. Cl. ............................................................ 280/804
[58] Field of Search .................... 280/804, 802, 803; 297/469; 24/200

[56] References Cited

U.S. PATENT DOCUMENTS

| 3,161,931 | 12/1964 | Zif | 24/200 |
| 3,831,971 | 8/1974 | Kaneko | 280/802 |
| 4,222,586 | 9/1980 | Takada | 280/804 |
| 4,241,939 | 12/1980 | Suzuki | 280/804 |

Primary Examiner—Robert R. Song
Attorney, Agent, or Firm—Stevens, Davis, Miller & Mosher

[57] ABSTRACT

A passive seatbelt system wherein a webbing is connected to a webbing guide movably received in a guide rail laid in or on a vehicle and the webbing guide is moved by a thick wall tape to cause the webbing to approach or recede from the body of an occupant of the vehicle. A tape casing for receiving the tail end portion of the thick wall tape is provided at a position adjacent to driving means for driving the thick wall tape in a panel of the vehicle.

13 Claims, 7 Drawing Figures

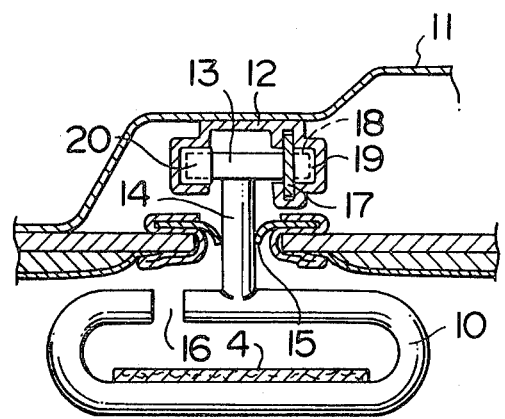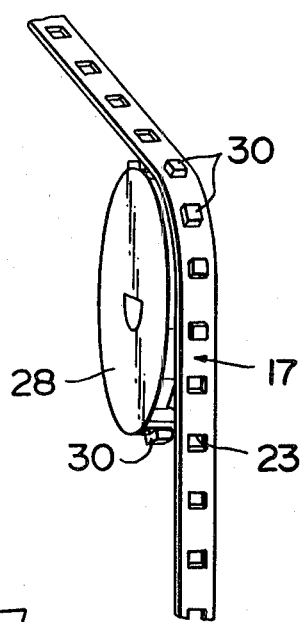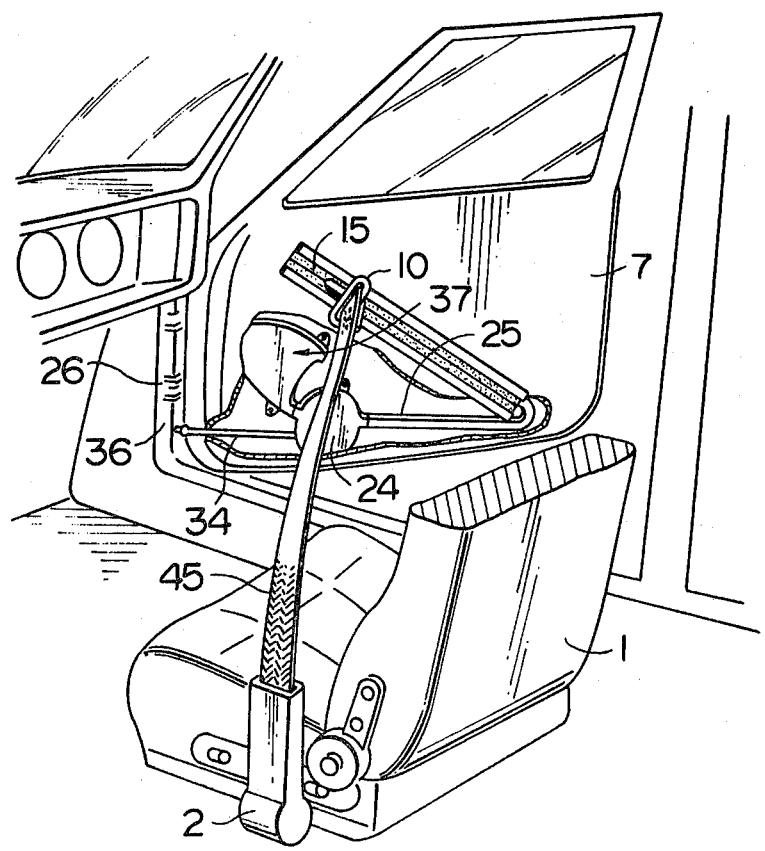

PASSIVE SEATBELT SYSTEM

BACKGROUND OF THE INVENTION

1. Field of the Invention

The present invention relates to passive seatbelt systems, and more particularly to a passive seatbelt systems having satisfactory operation.

2. Description of the Prior Art

Heretofore, there have been proposed webbing-type passive seatbelt systems which fasten automatically in order to improve the rate of wearers of seatbelts, thereby assuring the safety of an occupant of a vehicle in a vehicular emergency such as a collision. The seatbelt systems of the type described are constructed such that, when the door for entering or leaving a vehicle is opened or closed, a webbing which restrains the occupant is moved to a position forwardly of an occupant's seat to enlarge a space between the webbing and the occupant's seat so as to satisfactorily allow an occupant to enter or leave the vehicle, and, when the door is closed, the webbing moves toward the occupant's seat and returns to a position adjacent the occupant so that the webbing automatically restrains the occupant. One method of moving the webbing in the conventional passive seatbelt system in the manner described above includes the usage of a webbing guide connected to the intermediate portion of the webbing which is moved in a guide rail by means of a tape which in turn is movable in a panel of the vehicle.

However, in the conventional passive seatbelt system, in which the tape for moving the webbing guide is received in the panel of the vehicle, also present in the vicinity of the passive seat belt system mechanism are a regulator mechanism for vertically moving a door window pane, side bars for reinforcing the strength of the vehicle against possible impact force applied in the lateral direction of the vehicle and other members. Consequently, there is a danger that the tape movable in the panel of the vehicle may interfere with other members so that the smooth movement of the webbing is difficult to attain. Furthermore, due to the provision of a tape groove for guiding the tape, a problem is encountered since the moving resistance of the tape is high and the opposite surfaces of the tape come into frictional contact with the inner surfaces of the tape groove during the travel of the tape.

SUMMARY OF THE INVENTION

The present invention has been developed to obviate the abovedescribed problems of the prior art, and has as its object the provision of a passive seatbelt system, in which the interference of the tape for imparting a moving force to the webbing with other members in the panel of the vehicle is prevented, the resistance against the movement of the tape is low and the operation thereof is satisfactory.

In a passive seatbelt system having a webbing connected to a webbing guide movably received in a guide rail mounted in or on a vehicle whereby the webbing guide is moved by a thick wall tape to cause the webbing to approach or recede from the body of an occupant, the above described objective is accomplished in accordance with the present invention utilizing a tape casing for receiving the tail end portion of the thick wall tape located at a position adjacent driving means (which drives the thick wall tape in the panel of the vehicle).

BRIEF DESCRIPTION OF THE DRAWINGS

The abovementioned features and object of the present invention will become more apparent with reference to the following description, taken in conjunction with the accompanying drawings, wherein like reference numerals denote like elements, and in which:

FIG. 3 is a sectional view taken along the line III—III in FIG. 2; p FIG. 4 is an enlarged perspective view showing the interior of the driving means;

FIG. 7 is a perspective view showing a third embodiment of the present invention.

DETAILED DESCRIPTION OF THE INVENTION

Description will hereunder be given of the embodiments of the present invention with reference to the drawings.

Figure 1:
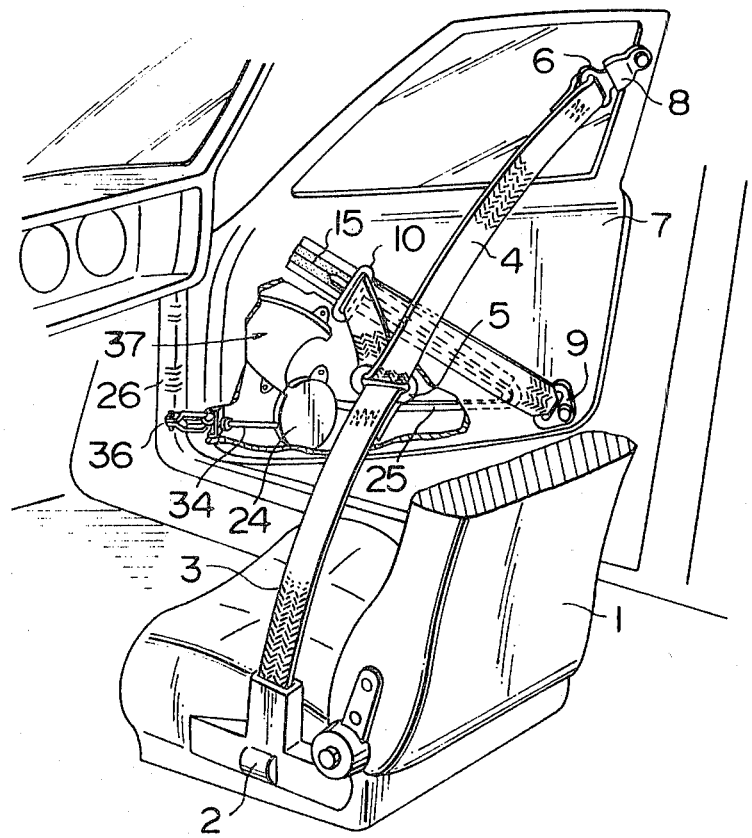
FIG. 1 is a perspective view showing a first embodiment of the passive seatbelt system according to the present invention.

FIGS. 1 through 5 are explanatory views showing the first embodiment of the passive seatbelt system according to the present invention. As shown in FIG. 1, an emergency locking type retractor 2 is secured to the side surface of a seat 1 at the center of the vehicle. One end of an inner webbing 3 is wound up into the retractor 2 by a biasing force, and a ring joint 5 slidably coupled onto the intermediate portion of an outer webbing 4 is secured to the other end of the inner webbing 3. Secured to one end of the outer webbing 4 is a tongue plate 6, which is engaged with a buckle 8 (for releasing the occupant in an emergency) solidly secured to a rear upper portion on the inner surface of a door 7. The other end of the outer webbing 4 is secured to a rear lower portion of the door 7 through an anchor plate 9. Furthermore, a webbing guide 10, which is a movable member of the intermediate portion of the webbing, is slidably and loosely coupled onto a portion of the outer webbing 4 between the anchor plate 9 and the ring joint 5.

Figure 2:
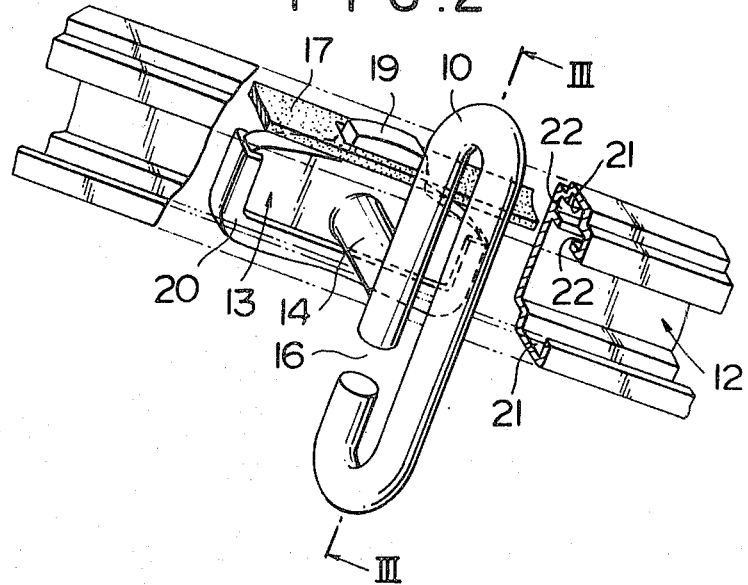
FIG. 2 is an enlarged perspective view showing the essential portions thereof.

As shown in FIGS. 2 and 3, the webbing guide 10 is connected to a movable plate 13 slidably mounted in a guide rail 12 fixed on a door panel, which is a reinforcing member provided in the door 7. The connection between webbing guide 10 and movable plate 13 is accomplished through a connecting bar 14, which is movable in a slit 15 provided in an inner plate. The webbing guide 10 is formed therein with an insert gate 16. The movable plate 13 is provided thereon with an engageable projection 18 for engagement with a thick wall tape 17. In order to smooth the sliding between the guide rail 12 and the movable plate 13, an upper shoe 19 is crowned onto the engageable projection 18, and a lower shoe 20 is crowned onto an end face of the movable plate 13 opposite to the engageable projection 18. The guide rail 12 is provided therein with a groove 21 for slidably receiving the movable plate 13 and a groove 22 for receiving the thick wall tape 17.

As shown in FIG. 4, the thick wall tape 17 has a rectangular shape in the vertical cross-section in the longitudinal direction thereof, and is penetratingly provided therein with a multiplicity of openings 23 at regular intervals in the longitudinal direction thereof.

The tail end portion of the thick wall tape 17 is wound up by driving means 24 provided in the door 7, the forward end portion of thick wall tape 17 is engaged with the movable plate 13, and the intermediate portion of thick wall tape 17 passes through both the groove 22 (established for the thick wall tape) in the guide rail 12 and a slide rail 25. More specifically, when the thick wall tape 17 is wound up by the driving means 24, the webbing guide 10 is moved toward the anchor plate 9, whereby the intermediate portion of the webbing is caused to approach the seat 1, so that the webbing can be positioned closely to the body of the occupant seated at the seat 1, thereby restraining the occupant. Furthermore, when the driving means 24 moves the thick wall tape 17 in the opposite direction, the webbing guide 10 is moved toward the door hinge 26, whereby the intermediate portion of the webbing is moved forward relative to the vehicle as shown in FIG. 1, so that a satisfactory space for entering or leaving the vehicle can be attained between the inner and outer webbings 3, 4 and the seat 1.

Figure 5:
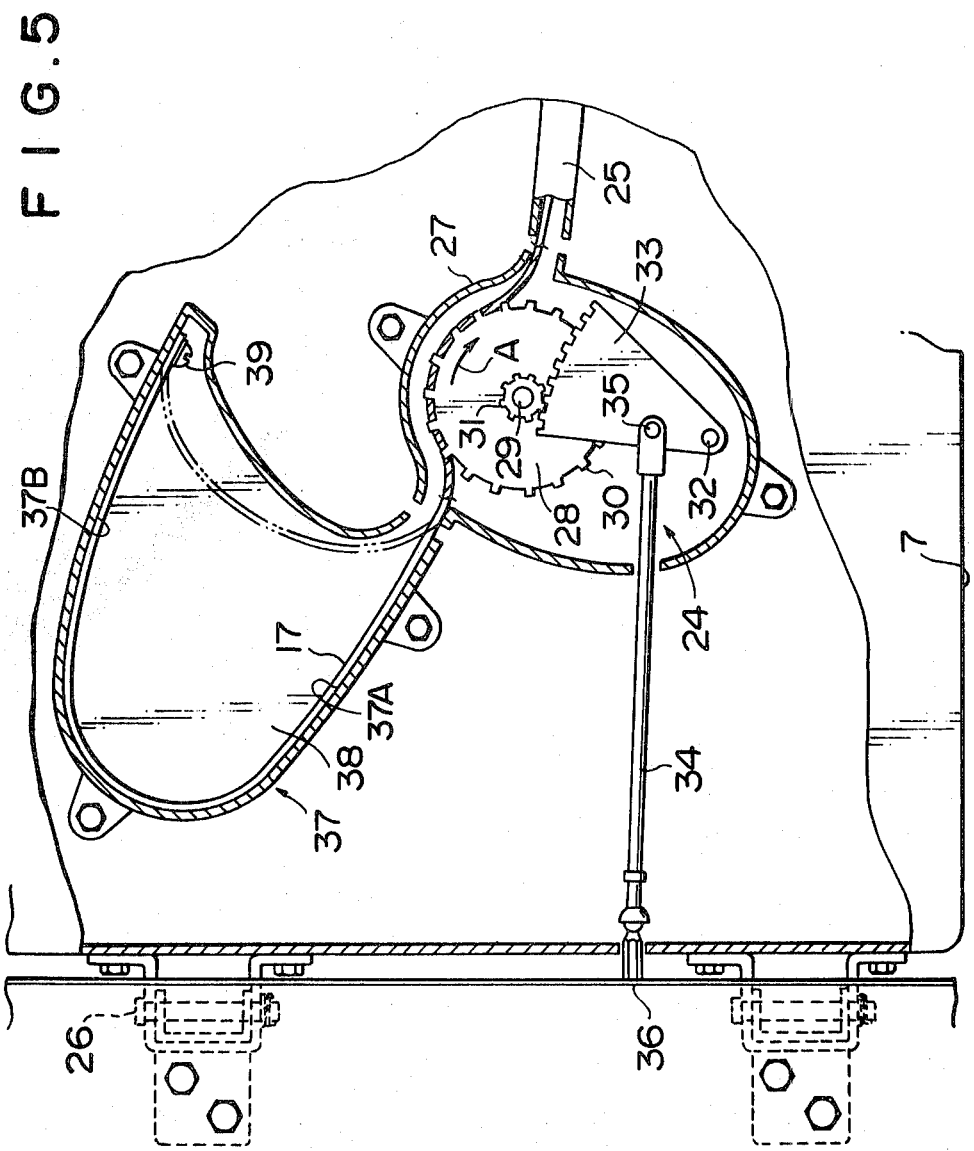
FIG. 5 is a sectional side view showing the interior of the door panel.

As shown in FIG. 5, a shaft 29 of a sprocket wheel 28 of the driving means 24 is pivotally supported by a housing 27 fixed in the door 7. The sprocket wheel 28 is provided on the outer periphery thereof with a multiplicity of projections 30 arranged at regular intervals and engageable with the multiplicity of openings 23 of the thick wall tape 17. Coaxially fixed on the sprocket wheel 28 is a pinion 31 meshing with a sector gear 33 rotatably pivoted on the housing 27 through a shaft 32. The gear diameter of the sector gear 33 is several times larger than that of the pinion 31, so that rotation of the sector gear 33 through a very small angle can rotate the sprocket wheel 28 several times. One end of a connecting rod 34 is pivotally supported on the intermediate portion of the sector gear 33 through a pin 35, and the other end of the connecting rod 34 is rotatably connected to a door securing portion 36 of the vehicle. More specifically, when the door 7 is opened, the connecting rod 34 transmits the opening force causing an oscillation of the sector gear 33, whereby the pinion 31 and the sprocket wheel 28 are rotated in a direction indicated by an arrow A (in FIG. 5) by the oscillating force of the sector gear 33, so that the webbing guide 10 connected to the thick wall tape 17 is moved back and forth in the vehicle as door 7 closes and opens.

Further, a tape casing 37 is fixed at a position opposite to the slide rail 25 contiguous to the housing 27 of the driving means 24 in the door 7. The tail end portion of the thick wall tape 17 is received in the tape casing 37, and the very end thereof is fixed on an inner surface of a side wall of the tape casing 37 through a mount screw 39. More specifically, when the door is closed and the webbing closely approaches the body of the occupant, a long portion of the tail end portion of the thick wall tape 17 is received in the tape casing 37 in a manner so as to contact the inner wall surface of the tape casing 37 as indicated by solid lines. Namely, the tail end portion of the thick wall tape 17 is U-shaped along the inner surface of tape casing 37. When the door 7 is opened and the webbing is separated from the body of the occupant, some of the tail end portion of the thick wall portion 17 is moved to the opposite side of housing 27 into slide rail 25 by the sprocket wheel 28, whereby only a short portion of the thick wall tape 17 as indicated by two-dot chain lines in FIG. 5 remains in the tape casing 37.

Description will hereunder be given of operation of the embodiment as described above. When the door 7 is opened as the occupant enters the vehicle, the door 7 pivots on hinge 26 while the door securing portion 36 of the vehicle body and the forward portion of the vehicle in the longitudinal direction thereof remain stationary relative to door 7. Consequently, the connecting rod 34 oscillates the sector gear 33 in the counterclockwise direction (as seen in FIG. 5) so as to rotate the pinion 31 and the sprocket wheel 28 in the direction indicated by the arrow A in FIG. 5. As openings in thick wall tape 17 mesh with projections 30 of the sprocket wheel 28, the rotation of the sprocket wheel 28 extracts some of the tail end portion of the thick wall tape 17 from a container chamber 38 of the taping case 37, and the thick wall tape 17 moves the webbing guide 10 forward in the longitudinal direction of the vehicle as illustrated in FIG. 1. Due to the movement of the webbing guide 10, the inner and outer webbings 3, 4 move in a direction of being separated from the seat 1, to thereby form a satisfactory space necessary for the occupant to enter or leave the vehicle.

When the occupant is seated at the seat 1 and the door 7 is closed, the connecting rod 34 rotates the sector gear 33 in the clockwise direction as seen in FIG. 5 to thereby turn the sprocket wheel 28 in a direction opposite to the arrow A. This rotation of the sprocket wheel 28 moves some of the thick wall tape 17 from the slide rail 25 into the container chamber 38 of the tape casing 37, to thereby cause the webbing guide 10 to approach the anchor plate 9. The movement of the webbing guide 10 causes the inner and outer webbings 3, 4 to move toward the seat 1, and so as to reliably restrain the body of the occupant seated at the seat 1.

Should the vehicle experience an emergency such as a collision when the webbing is in the restraining position as described above, the emergency locking mechanism, not shown, of the retractor 2 instantly stops the withdrawal of the inner webbing 3, whereby the occupant is reliably restrained by the inner and the outer webbings 3, 4, thus securing the occupant safely. In addition, when the occupant wants to escape from the vehicle, he can release the tongue plate 6 secured to one end of the outer webbing 4 from the buckle 8, so that the occupant can easily escape from the vehicle.

In the abovedescribed embodiment of the passive seatbelt system, the forward end portion of the thick wall tape 17 for driving the webbing guide 10 along the guide rail 12 is received in the groove 22 for the thick wall tape in the guide rail 12, the intermediate portion thereof is received in the slide rail 25 and meshed with the sprocket wheel 28 in the housing 27 of the driving means 24, and the tail end portion thereof is received in the container chamber 38 of the tape casing 37. Consequently, the thick wall tape 17, in its movement, does not interfere with other members provided in the panel of the door 7 and is smoothly movable, so that the webbing guide 10, the inner and outer webbings 3, 4 can be operated satisfactorily. Furthermore, when the thick wall tape 17 moves into or out of the tape casing 37, only one surface of the thick wall tape 17 slides on a portion of the inner surface of the tape casing 37. The thick wall tape 17 slides only on an inner surface portion 37A, but only approaches or recedes from an inner surface portion 37B, whereby the frictional resistance of the thick wall tape 17 due to the movement thereof into or out of the tape casing 37 becomes very low, thus smoothing the movement of the thick wall tape 17.

Figure 6:
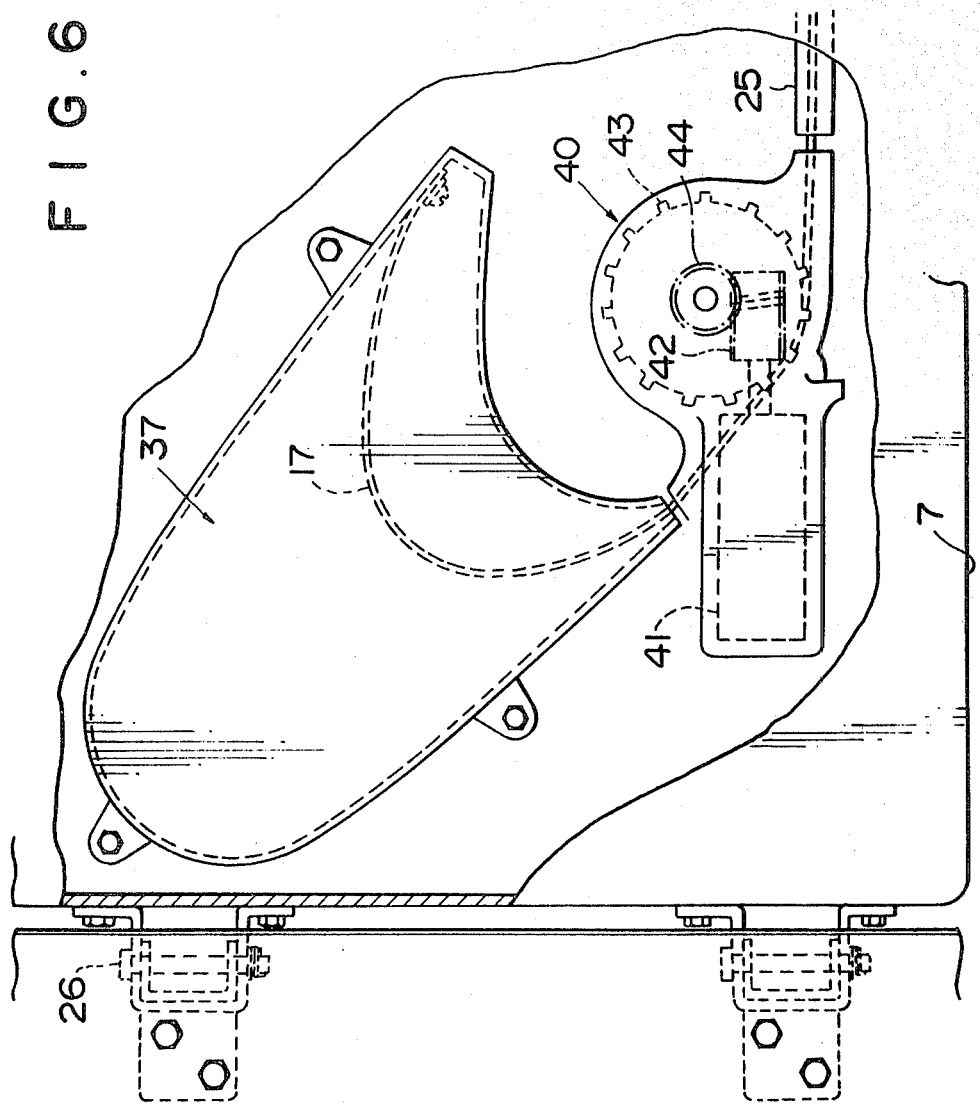
FIG. 6 is a side view showing the essential portions of a second embodiment of the present invention.

FIG. 6 is an explanatory view showing the essential portion of a second embodiment of the passive seatbelt system according to the present invention. The second embodiment differs from the abovedescribed first embodiment in that the driving method of driving means 40 for imparting the driving force to the thick wall tape 17 is different. More specifically, the driving means 40 incorporates therein a motor 41, and a worm 42 is fixed on an output shaft of the motor 41. Furthermore, coaxially fixed on a sprocket wheel 43 meshing with the openings 23 of the thick wall tape 17 is a worm wheel 44, which is meshed with the worm 42.

More specifically, in the second embodiment of the passive seatbelt system as described above, the motor 41 is rotated in the forward or rearward direction in dependence on the opening or closing action of the door 7, whereby the sprocket wheel 43 is rotated in the forward or rearward direction through the meshing of the worm 42 with the worm wheel 44, so that some of the thick wall tape 17 can be extracted from or lead into the tape casing 37.

Consequently, even in the second embodiment, in which the driving means 10 as described above is used, the thick wall tape 17 moves in a condition that its tail end portion is received in the tape casing 37, whereby the thick wall tape 17 does not interfere with other members in the panel of the door 7, so that the smooth movements of the webbing guide and webbing can be maintained.

FIG. 7 is an explanatory view showing a third embodiment of the passive seatbelt system according to the present invention. The third embodiment differs from the first embodiment in that one end of a webbing 45, which is adapted to approach or recede from the seat 1, is wound up by the biasing force of the retractor 2, and the other end thereof is secured to the webbing guide 10 movable along the guide rail 12.

Even with the arrangement of the webbing as shown in the third embodiment, the tape casing 37 for receiving therein the tail end portion of the thick wall tape 17 is provided in the door 7 as shown in the first embodiment, whereby the thick wall tape 17 is movable without interfering with other members in the panel, so that the smooth movements of the webbing guide 10 and webbing 45 can be maintained.

In addition, in the respective embodiment described above, the driving means 40 and tape casing 37 are provided in the panel of the door 7. However, in the passive seatbelt system according to the present invention, the provision of the driving means and tape casing in the panel of a vehicle body other than the door can also offer advantages similar to the above.

As apparent from the foregoing description, in the passive seatbelt system according to the present invention, the tape casing, which receives the tail end portion of the thick wall tape for moving the webbing guide so as to cause the webbing to approach or recede from the seat, is positioned adjacent to the driving means, so that the interference of the thick wall tape with other members can be prevented and the movement of the thick wall tape is smoothed, thereby offering the advantage of improving the operation of the webbing.

It should be apparent to one skilled in the art that the abovedescribed embodiments are merely illustrative of but a few of the many possible specific embodiments of the present invention. Numerous and varied other arrangements can be readily devised by those skilled in the art without departing from the spirit and scope of the invention.

What is claimed is:

1. A passive seatbelt system for automatically moving a seatbelt webbing to approach or recede from an occupant, comprising:
   a guide rail extending along a vehicle body;
   a webbing guide received in and movable along said guide rail;
   a thick wall tape extending along said guide rail and engaged with said webbing guide;
   a driving means for driving said thick wall tape to cause said webbing guide to move along said guide rail due to movement of said thick wall tape; and
   a tape casing adjacent to said driving means, said tape casing receiving a tail end portion of said thick wall tape, so that when maximum length of said tape is received within said tape casing, the tail end portion of said thick wall tape is substantially U-shaped along an inner surface of said tape casing, a tail end of said thick wall tape being fixed on the inner surface of said tape casing.

2. The passive seatbelt system as set forth in claim 1, wherein said webbing can be wound up by an emergency locking type retractor.

3. The passive seatbelt system as set forth in claim 1, wherein said webbing guide is connected to a movable plate slidable in the guide rail and said movable plate is provided thereon with an engageable projection, which is engageable with the thick wall tape.

4. The passive seatbelt system as set forth in claim 1, wherein said movable plate is crowned with shoes for smoothing the sliding with the guide rail.

5. The passive seatbelt system as set forth in claim 3, wherein said guide rail is provided therein with a groove for the movable plate and a groove for thick wall tape.

6. The passive seatbelt system as set forth in claim 1, wherein said webbing guide is formed with an insert gate for inserting therethrough the webbing.

7. The passive seatbelt system as set forth in claim 1, wherein said driving means comprises:
   a sector gear being oscillated by a door opening force;
   a pinion for meshing with said sector gear to rotate; and
   a sprocket wheel coaxially secured to said pinion and engageable with the thick wall tape.

8. The passive seatbelt system as set forth in claim 1, wherein said driving means comprises:
   a motor;
   a worm fixed on an output shaft of said motor;
   a worm wheel for meshing with said worm to rotate; and
   a sprocket wheel coaxially secured to said worm wheel and engageable with the thick wall tape.

9. The passive seatbelt system as set forth in claim 1, wherein said tape casing and said driving means are provided in a panel of a door.

10. A passive seatbelt system for automatically moving a seatbelt webbing so as to approach or recede from an occupant of the seat, comprising:
    means for forming a rail mounted on the vehicle;
    means for guiding the webbing in movable engagement with said rail means, said guiding means having a first position in which the webbing restrains the movement of the occupant and a second position in which the webbing is significantly forward of the occupant so as to allow exit and entry;

means for transmitting motion to said guiding means, said transmitting means being in operative engagement with said guiding means;

means for driving said transmitting means so as to impart motion thereto, said driving means being in operative engagement with said transmitting means;

means for positioning said transmitting means such that said transmitting means moves without excessive interference as it transmits motion from said driving means to said guiding means; said positioning means comprising means for holding a reserve portion of said transmitting means which is not positioned between said driving means and said guiding means; the maximum length of said reserve portion of said transmitting means within said holding means occurring when said guiding means is closest to said driving means and the minimum length of said reserve portion within said holding means occurring when said guiding means is furthest from said driving means, said reserve portion of said transmitting means having a portion fixedly secured to said holding means by means for securing said transmitting means such that a portion of said transmitting means remains fixed throughout the operation of said passive seatbelt system and when said guiding means is furthest from said driving means the reserve portion of said transmitting means is supported by said securing means and upon movement of said guiding means toward said driving means said reserve portion of said transmitting means is caused to curl within said holding means;

whereby the portion of said transmitting means in surface contact with said holding means is minimized during the course of movement of said guiding means so as to minimize frictional resistance.

11. The passive seatbelt system of claim 10 wherein said holding means has a U-shaped internal surface and a substantial portion of said reserve portion is in surface contact with said holding means when the maximum length of said transmitting means is within said holding means.

12. The passive seatbelt system of claim 11 wherein the only portion of said reserve portion in surface contact with said U-shaped surface of said holding means when said guide means is furthest from said driving means is the portion in the immediate vicinity of said securing means.

13. The passive seatbelt system of claim 10, 11, or 12 wherein said securing means comprises a fastener which fixedly connects a portion of said transmitting means to said holding means.

* * * * *